INVENTOR.
RUSSELL A. HEMSTREET

BY Jonathan Blaut

ATTORNEY

United States Patent Office 3,282,750
Patented Nov. 1, 1966

---

3,282,750
TRIOXYGEN DIFLUORIDE IN LIQUID OXYGEN
Russell A. Hemstreet, Mountainside, N.J., assignor to Air Reduction Company Incorporated, New York, N.Y., a corporation of New York
Filed Dec. 31, 1964, Ser. No. 422,618
2 Claims. (Cl. 149—1)

This invention relates to a novel process for the production of $O_3F_2$ (tri-oxygen difluoride, sometimes called ozone fluoride) dissolved in liquid oxygen.

More particularly, this invention relates to the production of $O_3F_2$ dissolved in liquid oxygen in an efficient and practical way under such conditions so as to have concentrations up to .11 weight percent of $O_3F_2$ dissolved in liquid oxygen.

In the past solutions of $O_3F_2$ in liquid oxygen have been made in a number of hazardous and cumbersome manners, usually necessitating the cumbersome and hazardous addition of pure $O_3F_2$ to liquid oxygen after the $O_3F_2$ is made, often not achieving the concentration of $O_3F_2$ in liquid oxygen desired.

One such old manner for preparing solutions of $O_3F_2$ in liquid oxygen involves the reaction between gaseous fluorine and gaseous oxygen under the influence of a glow discharge under low pressure and low temperature in order to first prepare $O_3F_2$. The pure $O_3F_2$ evolving therefrom is a viscous liquid at 90° K. and is independently introduced into liquid oxygen, solution of said viscous liquid $O_3F_2$ and liquid oxygen being effected by stirring. The only means of effectively controlling the final concentration of $O_3F_2$ and liquid oxygen in this method of preparation is by judicious balancing of the amount by weight of $O_3F_2$ and liquid oxygen. Such process of creating $O_3F_2$ and then intermixing it with liquid oxygen suffers from several basic disadvantages. For one, this method of production is inefficient, very slow and usually because of equipment size restrictions, not suited to produce large quantities of $O_3F_2$. For a second, pure $O_3F_2$ is extremely unstable and is a very hazardous material; it will cause ignition and usually violent explosion when in contact with any oxidizable material. Frequently, explosions result merely upon contact of pure $O_3F_2$ and ice (solid water) which is frequently found in liquid oxygen. A further disadvantage is encountered in the fact that the solution of pure $O_3F_2$ in liquid oxygen is a slow process frequently requiring periods of several hours or more to dissolve 5 to 10 grams of pure $O_3F_2$ in liquid oxygen. A further disadvantage of the process described above is that the mixing of pure $O_3F_2$ with liquid oxygen is extremely difficult since $O_3F_2$ must be handled at temperatures of liquid oxygen or it will decompose (decomposition of pure $O_3F_2$ will take place at temperatures only a few degrees higher than the temperature of liquid oxygen). Added to the problem of decomposition and loss of product is the even greater problem that one of the decomposition products, that is, free fluorine, is toxic and dangerous in itself.

With the above statements in mind, it must still be remembered that $O_3F_2$ dissolved in liquid oxygen under certain conditions to be described in more detail hereinafter is an extremely desirable composition. Among a growing list of uses, it has been found to be an extremely valuable hypergolic additive to liquid oxygen to (1) facilitate the ignition of the fuel and oxidizer in a rocket engine, (2) eliminate the blast effect or detonation possible upon accidental mixing of the fuel and oxidizer (in the event that the fuel and oxidizer accidentally mix in a rocket, it is advantageous to have an immediate fire rather than a delay and then an explosion), and (3) improve combustion stability of the fuel and oxidizer in a rocket engine.

The Japanese publication by S. Aoyama and S. Sakuraba of the J. Chem. Soc. Japan 62,208 (1941), discloses the making of pure $O_3F_2$ by reaction between liquid oxygen and liquid fluorine under the influence of light at 77° K. The Japanese publication process suffers from a number of serious disadvantages, for example, those discussed above. Further it lacks suggestion of making high concentration product $O_3F_2$ in liquid oxygen directly.

The space industry needs discussed in the penultimate paragraph above, as well as other needs increasingly coming to light, require concentrations of $O_3F_2$ in liquid oxygen of from about .05 to up to .11 weight percent. That upper limit (.11 weight percent) is the natural solubility limit of $O_3F_2$ in liquid oxygen at 90° K.

It is therefore an object of this invention to provide $O_3F_2$ dissolved in liquid oxygen without the hazards and impracticalities previously encountered in the production of pure $O_3F_2$ and subsequent intermixture with liquid oxygen.

It is further an object of this invention to safely and efficiently provide for $O_3F_2$ in solution with liquid oxygen at a solubility from about .05 weight percent to .11 weight percent $O_3F_2$ in liquid oxygen.

It is further an object of this invention to safely and efficiently provide for the continuous production of $O_3F_2$ in solution with liquid oxygen at a solubility from about .05 weight percent to .11 weight percent $O_3F_2$ in liquid oxygen.

These and other objects and advantages of this invention will become more apparent from the following description.

Generally speaking, the process of our invention entails introducing gaseous fluorine at a temperature from ambient to that temperature of liquid oxygen, no precooling of the gaseous fluorine therefore being required, into a bath of liquid oxygen. The liquid oxygen supplies the only refrigeration necessary for the reaction. The gaseous fluorine dissolves in the liquid oxygen. The chemical reaction between the gaseous fluorine and liquid oxygen is effected in the presence of radiation, of not less than about 2,000 A. or $O_3$ (ozone) will be formed. The equation of the process is as follows:

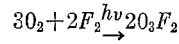

$$3O_2 + 2F_2 \xrightarrow{hv} 2O_3F_2$$

Key: $hv$=radiation.

The invention will now be described with more particularity with relation to the following drawings.

Figure 1:
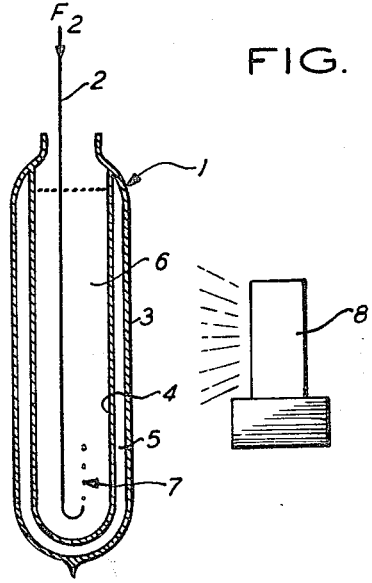
FIGURE 1 shows exemplary apparatus for carrying out the process defined.

In FIGURE 1, the gaseous fluorine is introduced through a line 2 into a glass container generally shown at 1. The glass container is made up of inside and outside glass jackets 3 and 4 respectively with a vacuum space 5 therebetween. The inner glass jacket 4 is filled with liquid oxygen 6. The fluorine bubbles out of the tube 2 (at 7) to dissolve in the liquid oxygen, the reaction being driven by the radiation source shown generally at 8, which exposes the liquid oxygen with dissolved fluorine gas therein to light of such wave length as to produce $O_3F_2$. The radiation source may be external to the liquid oxygen-gaseous fluorine mixture (as shown in FIGURE 1) or the liquid oxygen gaseous fluorine mixture may surround the radiation source (not shown). It is emphasized that the drawing of FIGURE 1 is merely illustrative of equipment that may be used to produce $O_3F_2$ in liquid oxygen.

It is necessary that the frequency or wave length of the radiation used be in a range or region where it (the radiation) is absorbed by either the oxygen or the fluorine. This range lies between about 2,000 and about 5,000 A. Red light, for example, in the range of 6,000 to 7,000 A. is not strongly absorbed by either the liquid oxygen or the gaseous fluorine and thus would have substantially no effect in driving the reaction to the production of trioxygen di-fluoride ($O_3F_2$).

The $O_3F_2$ produced as described in relationship to FIGURE 1 above is not pure but in a solution of liquid oxygen. Pure $O_3F_2$ does not form and as a consequence, it is not necessary to either handle pure $O_3F_2$ (which is hazardous) or to attempt to dissolve it in liquid oxygen to obtain the desired product. In other words, the desired product $O_3F_2$ in liquid oxygen is obtained directly by the reaction of dissolved gaseous fluorine in liquid oxygen.

The concentration of $O_3F_2$ in liquid oxygen is controlled by (1) the initial concentration of gaseous fluorine dissolved in the liquid oxygen and (2) the exposure time or contact time of this solution (gaseous fluorine in liquid oxygen) with the radiation. The liquid oxygen may be totally saturated with the $O_3F_2$ so as to have approximately .11 percent by weight $O_3F_2$ in liquid oxygen.

Figure 2:
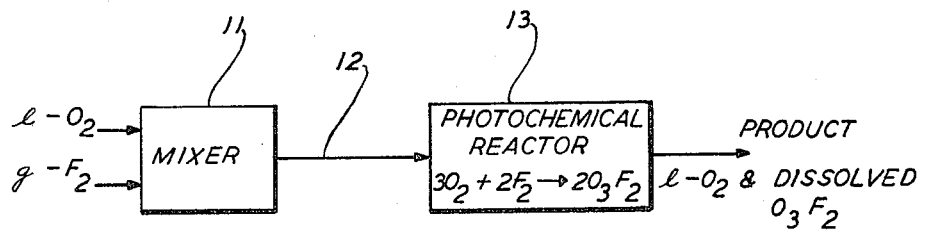
FIGURE 2 shows schematically a continuous process for producing $O_3F_2$ in liquid oxygen.

My process is extremely advantageous for the continuous production of $O_3F_2$ dissolved in liquid oxygen. Referring to FIGURE 2, which is a schematic showing of a continuous process used for illustrative purposes only, liquid oxygen and gaseous fluorine are introduced into a mixing chamber 11 from which emerges fluorine dissolved in liquid oxygen (shown at 12). The gaseous fluorine dissolved in liquid oxygen is introduced into a photochemical reactor 13 where the dissolved fluorine in liquid oxygen is driven by radiation of from about 2,000 A. to about 5,000 A. to the creation of $O_3F_2$ dissolved in the liquid oxygen. By varying the ratio of liquid oxygen to gaseous fluorine in the mixture and the intensity of the radiation source in the photochemical reaction, the concentration of $O_3F_2$ in the product $O_3F_2$ dissolved in liquid oxygen can be varied.

It is not intended that any of the details of apparatus or particular details of the process discussed hereinbefore shall limit my invention, but rather that the scope of my invention be determined by examination of the following claims.

I claim:

1. A process for the production at a temperature of about 90° K. of $O_3F_2$ in liquid oxygen comprising, introducing gaseous fluorine at a temperature in the range of about ambient to about that temperature of liquid oxygen into a pool of liquid oxygen, irradiating said mixture of oxygen and fluorine with radiation of a wave length of between about 2,000 and 5,000 A. and subjecting the mixture to said radiation for a period of time sufficient to produce more than about .05 weight percent and up to .11 weight percent $O_3F_2$ in liquid oxygen.

2. In a continuous process for the production at a temperature of about 90° K. of $O_3F_2$ in liquid oxygen of a concentration more than about .05 weight percent and up to .11 weight percent $O_3F_2$ in liquid oxygen, the steps of intermixing liquid oxygen from one source and gaseous fluorine at a temperature in the range of about ambient to about that temperature of liquid oxygen from a second source so as to dissolve the gaseous fluorine in the liquid oxygen, then subjecting said liquid oxygen with dissolved fluorine therein to irradiation of a wave length of between about 2,000 and 5,000 A. so as to drive the reaction to the production of $O_3F_2$ in liquid oxygen of said concentration, and then removing the product $O_3F_2$ in liquid oxygen of said concentration.

References Cited by the Examiner
UNITED STATES PATENTS

| | | | |
|---|---|---|---|
| 1,430,035 | 9/1922 | Snelling | 204—157 |
| 2,364,940 | 12/1944 | Bies. | |
| 2,930,684 | 4/1960 | Karanek | 149—1 |
| 2,958,638 | 11/1960 | Tarmy | 204—193 |
| 2,992,980 | 7/1961 | Suttle | 204—193 |
| 3,170,282 | 2/1965 | Kirshenbaum et al. | 60—35.4 |

OTHER REFERENCES

Aoyama et al.: Chem. Abs., vol. 35, page 4699, (1941), QD1 A51.

Kirshenbaum et al.: Chem. Abs., vol. 56, page 13754, (1962), QD1 A51.

BENJAMIN R. PADGETT, *Primary Examiner.*

LEON D. ROSDOL, *Examiner.*

L. A. SEBASTIAN, *Assistant Examiner.*